(12) United States Patent
Moran et al.

(10) Patent No.: US 12,497,151 B2
(45) Date of Patent: Dec. 16, 2025

(54) SYSTEM AND METHOD FOR ALLEVIATING AMBIENT TORSIONAL LOADS AFFECTING MARINE VESSEL PROPULSION

(71) Applicant: MARINE EDGE LTD., Haifa (IL)

(72) Inventors: Mark Moran, Tel Aviv (IL); Nevo Dotan, Beerotayim (IL); Amichay Haim Gross, Herzliya (IL)

(73) Assignee: MARINE EDGE LTD., Haifa (IL)

( * ) Notice: Subject to any disclaimer, the term of this patent is extended or adjusted under 35 U.S.C. 154(b) by 441 days.

(21) Appl. No.: 18/200,817

(22) Filed: May 23, 2023

(65) Prior Publication Data
US 2024/0217641 A1   Jul. 4, 2024

Related U.S. Application Data (63) Continuation-in-part of application No. 18/091,200, filed on Dec. 29, 2022, now Pat. No. 11,731,749.

(51) Int. Cl.
*B63H 21/20*    (2006.01)
*B63H 21/21*    (2006.01)

(52) U.S. Cl.
CPC .............. *B63H 21/20* (2013.01); *B63H 21/21* (2013.01); *B63H 2021/205* (2013.01); *B63H 2021/216* (2013.01)

(58) Field of Classification Search
CPC .. B63H 21/20; B63H 21/21; B63H 2021/216; B63H 2021/205
See application file for complete search history.

(56) References Cited

U.S. PATENT DOCUMENTS 11,464,138 B2 *   10/2022   Krivonak ............. H05K 7/2039
11,731,749 B1 *    8/2023   Moran ................... B63H 21/21
                                                           440/1

(Continued)

FOREIGN PATENT DOCUMENTS

CA      2455290 C   *   5/2007   ............. B63H 20/20
NO      2019060411 A1     7/2017

(Continued)

OTHER PUBLICATIONS

European Patent Office, Extended European Search Report for European Patent Application No. 23175502.6, dated Dec. 19, 2023, 11pp.

*Primary Examiner* — S. Joseph Morano
*Assistant Examiner* — Jovon E Hayes
(74) *Attorney, Agent, or Firm* — The Roy Gross Law Firm, LLC; Roy D. Gross (57) ABSTRACT

A system for alleviating variations in torsional loads applied to a shaft coupled to a main engine of a marine vessel, said shaft is coupled to a propeller of the marine vessel, the system comprising an electric motor-generator configured to provide power to the shaft or take out power from the shaft; a controller coupled to the electric motor-generator said controller is configured to execute instructions, comprising: measuring a group of values that are indicative of torsional loads applied on a shaft of the marine vessel over time; creating a time-based series of values that represent a predictive time-based torsional loads on the marine vessel; collecting readings indicative of power provided by a main engine of the marine vessel; computing an intervention time series of power values to be outputted by the electric motor-generator; wherein the electrical power outputs the intervention time series values of power to the shaft.

22 Claims, 9 Drawing Sheets

(56) References Cited

U.S. PATENT DOCUMENTS

| | | | |
|---|---|---|---|
| 2009/0037060 A1* | 2/2009 | Carlhammar | B60W 10/06 |
| | | | 180/65.265 |
| 2012/0083173 A1 | 4/2012 | Mcmillan | |
| 2019/0084657 A1* | 3/2019 | Oestrem | G07C 5/0816 |
| 2021/0027225 A1* | 1/2021 | Mikalsen | B63B 79/40 |

FOREIGN PATENT DOCUMENTS

| | | | | |
|---|---|---|---|---|
| WO | WO-03019759 A2 * | 3/2003 | | H02K 5/20 |
| WO | 2019060411 A1 | 3/2019 | | |
| WO | WO-2022049081 A1 * | 3/2022 | | B63H 21/20 |

\* cited by examiner

FIG. 7

SYSTEM AND METHOD FOR ALLEVIATING AMBIENT TORSIONAL LOADS AFFECTING MARINE VESSEL PROPULSION

CROSS-REFERENCED TO RELATED APPLICATIONS

This application is a Continuation-in-part of U.S. patent application Ser. No. 18/091,200, filed Dec. 29, 2022, the contents of which are all incorporated herein by reference in their entirety.

FIELD OF THE INVENTION

The present disclosure relates to devices and methods for improving vessel propulsion, and more particularly, but not exclusively, to devices and methods for increasing marine vessel propulsion efficiency.

BACKGROUND OF THE INVENTION

During a ship's journey, variable loads are exerted continuously by the waves and sea on a ship's propeller and shaft. These loads are transmitted directly through the shaft system to the engine, causing the engine's governor to increase the amount of fuel injected when the load increases and to reduce the amount of fuel injected when the load decreases, in order to maintain a certain set RPM. This phenomenon implies inefficiency in fuel consumption caused by continuously changing ambient torsional loads deriving from waves, sea-state, random ship pitch motions, winds and gusts, pressures affecting ship's propeller and so on; which become more significant when traveling long distances.

Use of hybrid type ship propulsion can somewhat improve fuel efficiency however its design and use are not intended nor optimal for reducing effects of ambient torsional loads during long journeys and/or prolonged periods of constant engine set RPM. Therefore, there is an ongoing need for improving marine vessel propulsion efficiency, particularly by diminishing effects of ambient torsional loads affecting marine vessel propulsion.

Furthermore, hybrid propulsion systems are considered very costly and require replacing entire propulsion system or entire ship. Therefore, there is an ongoing need for systems and methods configurable to improve efficiency of existing marine vessels and marine vessel propulsion systems while substantially reducing overall costs.

SUMMARY OF THE INVENTION

The present disclosure relates to devices and methods for vessel propulsion, and more particularly, but not exclusively, to devices and methods for increasing efficiency in marine vessel propulsion.

The subject matter relates to systems that have torsional load which changes during a cycle. The cycle may be caused by objects external to the system, such as sea waves. The subject matter relates to the use of produced and/or stored electrical energy for alleviating variations in torsional loads affecting fuel-based marine vessel propulsion systems, thereby conserving fuel, increasing fuel efficiency and/or cutting unnecessary fuel costs.

The subject matter discloses a system for alleviating variations in torsional loads applied to a shaft coupled to a main engine of a marine vessel, said shaft is coupled to a propeller of the marine vessel, the system comprising: an electric motor-generator configured to provide power to the shaft or take out power from the shaft; a controller coupled to the electric motor-generator said controller is configured to execute a set of instructions, comprising: measuring a group of values that are indicative of torsional loads applied on a shaft of the marine vessel over time; creating a time-based series of values that represent a predictive time-based torsional loads on the marine vessel; collecting a group of readings indicative of the amount of power provided by a main engine of the marine vessel; computing an intervention time series of power values to be outputted by the electric motor-generator; wherein the electrical power outputs the intervention time series values of power to the shaft.

In some cases, the instructions further comprise collecting new readings produced by the sensor providing the values indicative of torsional loads of the main engine and inclusive electric motor-generator activity over a wave cycle; determining if the new wave pattern is significantly different from the previous wave pattern; computing a new intervention vector of forces based on the new pattern and applying the new intervention vector of forces on the shaft.

In some cases, the system further comprises a main engine sensor configured to measure the torsional loads on the shaft on an intervention section, said intervention section is defined as a section on the shaft located between the point where the main engine is coupled to the shaft and the point where the electric motor-generator is coupled to the shaft.

In some cases, the main engine sensor is coupled to the electric motor-generator to provide signals representing the load sensed by the main engine.

In some cases, the system further comprises a torsional sensor located on the shaft between the propeller and the point where the electric motor-generator is coupled to the shaft.

In some cases, the system further comprises a fuel sensor configured to collect readings indicative of a fuel flow rate provided to the main engine.

In some cases, the system further comprises a motion sensor of the ship configured to collect readings indicative of ship motion and acceleration in three dimensions.

In some cases, the system further comprises an input from the integral main engine controller (governor) of the ship configured to collect readings indicative of the actions performed by it.

In some cases, computing the intervention time series of power values to be outputted by the electric motor-generator based on torsional loads indicative of multiple wave cycles.

In some cases, computing the intervention time series of power values to be outputted by the electric motor-generator based on a software model, wherein the software model is configured to reach a minimal value of differences in power outputted by the main engine of the marine vessel.

In some cases, computing the intervention time series of power values to be outputted by the electric motor-generator based on a target variable of minimal integral of absolute values produced by the main engine of the marine vessel.

In some cases, the instructions further comprise determining a time delay of the main engine based on the readings indicative of the amount of power provided by a main engine of the marine vessel.

In some cases, the instructions further comprise determining an effect of the electric motor-generator on the torsional values of the main engine and inclusive electric motor-generator over a wave pattern;

collecting readings produced by the sensor providing the torsional values of the main engine and inclusive electric motor-generator activity over a wave pattern.

In some cases, the software model is configured to compute optimized time series of power intervention values with taking into consideration: a) the overall system energy efficiency; b) the charge/discharge optimal regime of the energy storage; c) the marine vessel's inherent time delay in providing power to counteract the waves loads.

In some cases, the system further comprises at least one generator configured to alleviate variations of ambient torsional loads by applying electricity generation variating regime according to the optimized time series of power intervention values.

In some cases, the system further comprises at least one electrical motor utilizing external energy sources to alleviate variations of ambient torsional loads by applying assisting power according to the optimized time series of power intervention values.

All technical or/and scientific words, terms, or/and phrases, used herein have the same or similar meaning as commonly understood by one of ordinary skill in the art to which the invention pertains, unless otherwise specifically defined or stated herein. Illustrative embodiments of methods (steps, procedures), apparatuses (devices, systems, components thereof), equipment, and materials, illustratively described herein are exemplary and illustrative only and are not intended to be necessarily limiting. Although methods, apparatuses, equipment, and materials, equivalent or similar to those described herein can be used in practicing or/and testing embodiments of the invention, exemplary methods, apparatuses, equipment, and materials, are illustratively described below. In case of conflict, the patent specification, including definitions, will control.

BRIEF DESCRIPTION OF THE DRAWINGS

Some embodiments are herein described, by way of example only, with reference to the accompanying drawings. With specific reference now to the drawings in detail, it is stressed that the particulars shown are by way of example and for purposes of illustrative description of some embodiments. In this regard, the description taken together with the accompanying drawings make apparent to those skilled in the art how some embodiments may be practiced.

In the drawings.

DETAILED DESCRIPTION

Certain embodiments relate to devices and methods for vessel propulsion, and more particularly, but not exclusively, to devices and methods for increasing marine vessel propulsion efficiency.

The present disclosure describes system and method intended for compensating everchanging, waves or oscillations (e.g., fluctuations or perturbations) of torsional loads exerted on a ship's propeller and/or shaft and transmitted onto ship's main engine during a journey, with purpose to create a less oscillatory or variable load environment for the main engine by using a proprietary algorithm for prediction of the load pattern. The requested result is diminishing or nulling the effect of ambient torsional loads on the propeller and/or shaft, and therethrough to the engine, thereby reducing the unnecessary losses in engine work and fuel consumption. Ambient loads compensation may include actively reducing load magnitudes optionally by way of damping, leveling.

The disclosed system and method are optionally configured to apply active load compensation based on measured data indicative of conditions affecting a ship and/or ship's propulsion system, and/or how it is transmitted to propeller and drive shaft as ambient torsional loads. This may be achieved by recording events during a period that exceeds multiple wave cycles using one or more sensors, of one or more types, optionally distributed at different locations in or around ship's hull and/or the ship's propulsion system. The recorded data then analyzed in order to detect torsional load pattern and time lagging of the ship's reaction to the fluctuating load. The disclosed system and method may incorporate a control system configured with feedback control, feedforward control, or a combination thereof, allowing it to determine a set of load alleviation interventions, each having a certain calculated magnitude, direction, and/or timing.

The disclosed system and method are optionally configured to use produced and/or stored electrical energy for alleviating variations in torsional loads affecting fuel-based marine vessel propulsion systems, thereby conserving fuel, increasing fuel efficiency and/or cutting unnecessary fuel costs.

The disclosed system may include various components ordinarily found in ship's existing propulsion systems (such as the main engine), or it can be retrofitted on existing propulsion systems and installed on seagoing vessels to improve its propulsion efficiency as described.

Figure 1A:
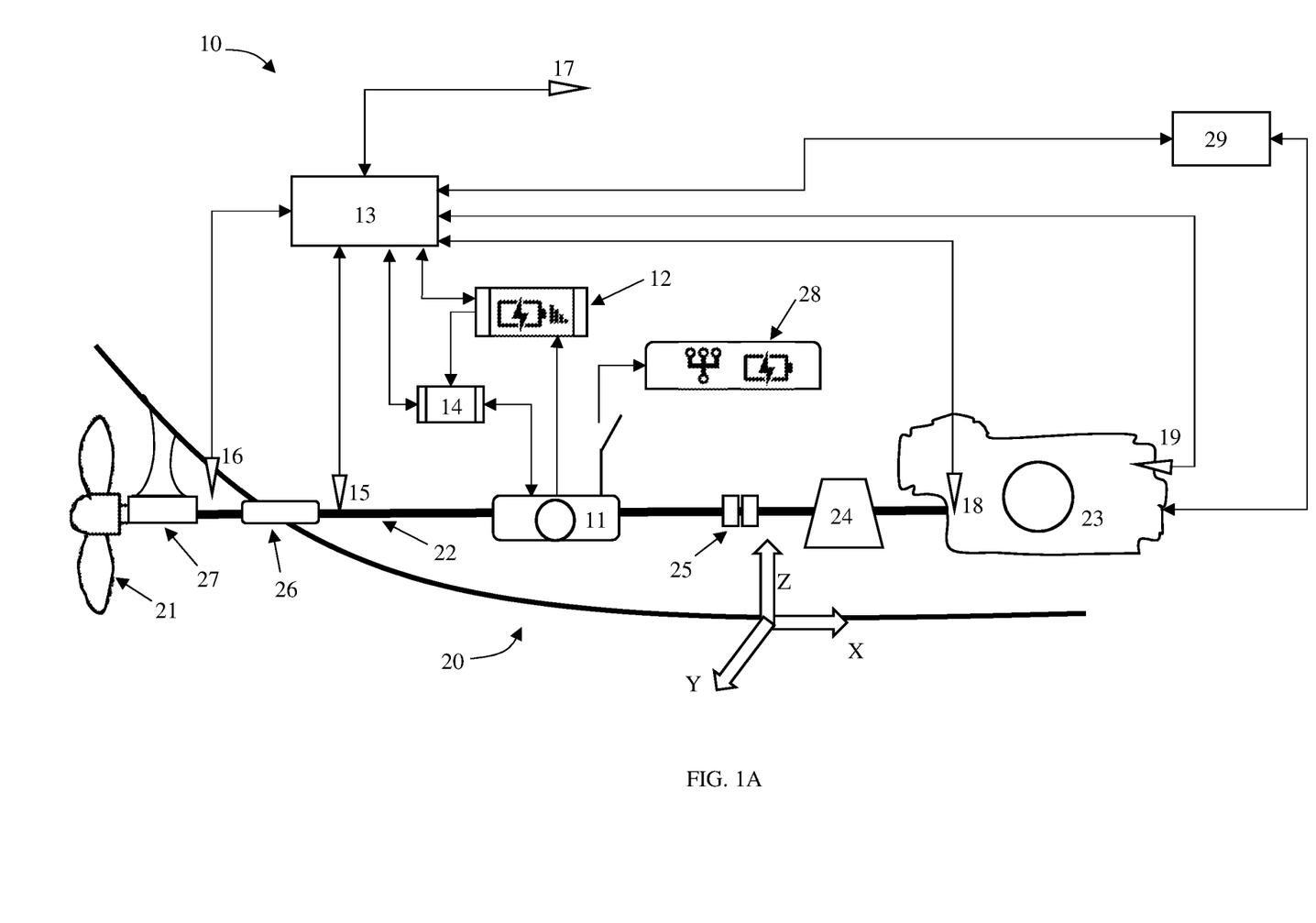
FIGS. 1A-1B schematically illustrate exemplary variations of a system for alleviating variations in ambient torsional loads affecting marine vessel propulsion, according to some embodiments.
Figure 1B:
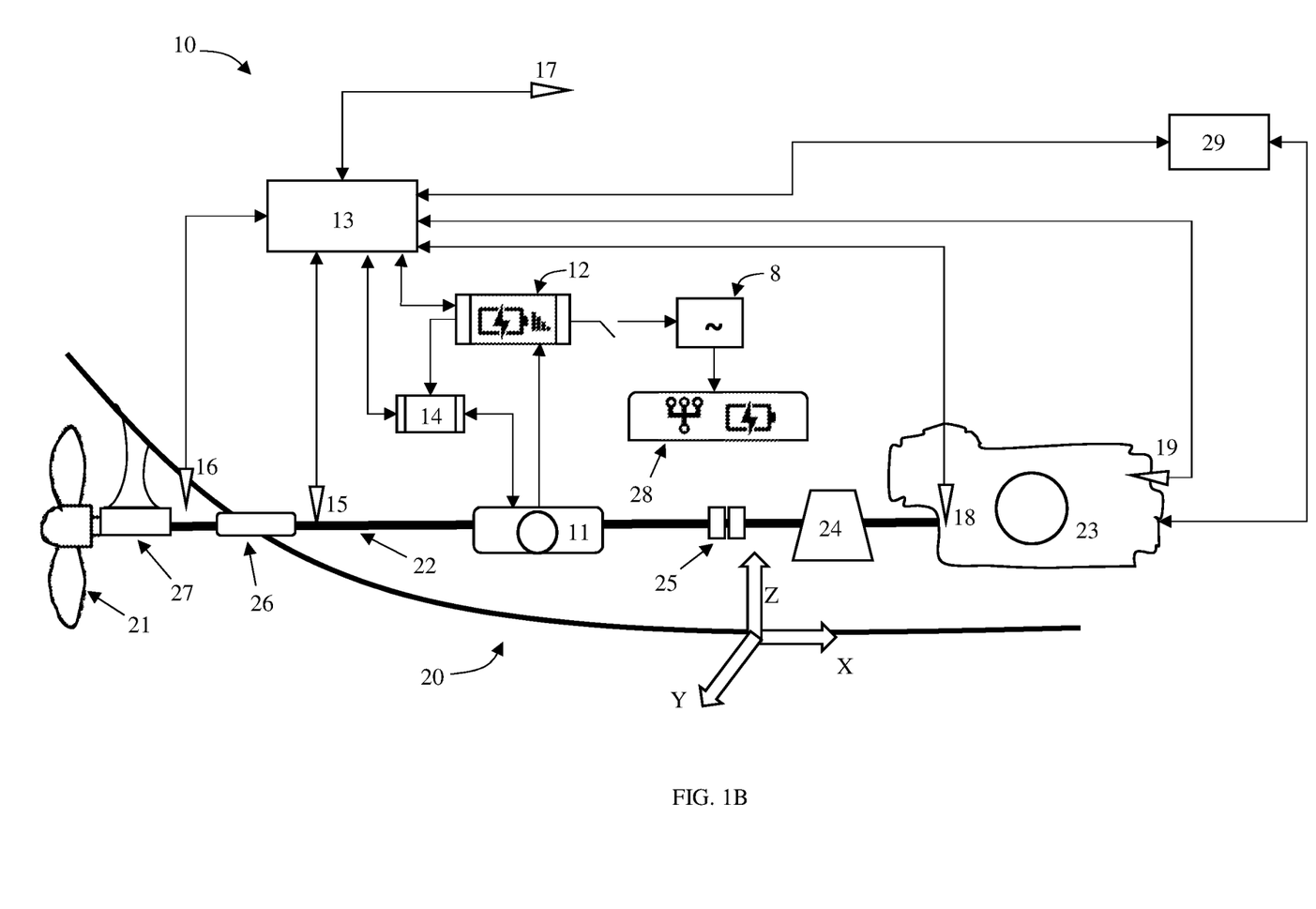

Referring to the figures, FIGS. 1A-1B schematically illustrate an exemplary system 10 configured for alleviating variations in ambient torsional loads acting on a propeller 21 and/or a shaft 22 coupled to and mutually rotatable by a main engine 23 of a ship propulsion system 20. Propulsion system 20 may be coupled to shaft 22 through a reduction gear 24 for controlling a chosen torque-to-RPM ratio exerted to shaft 22. Shaft 22 is connected to the ship body with one or more bearing units such as a spring bearing 25 and a stern tube bearing 26. Propeller 21 may be coupled to the ship body with one or more bearing units such as strut bearing 27. The propulsion system 20 may further include a main electric board and consumer 28 and a main-engine control unit 29.

System 10 includes one or more of the following components: an electric motor-generator 11, a power (energy) reservoir 12, a controller 13 (e.g., an energy control unit), and a shaft manipulator 14 (e.g., a variable torque controller). The electric motor-generator 11 may be a single or combined entity of a motor and/or a generator, or optionally, several separate entities: a generator (s) and an electric motor (s).

Electric motor-generator 11 is configured to allocate electric power from main engine 23 to power reservoir 12, when a measured torsional load exerted on shaft 22 is smaller than a value, and/or to allocate electric power to main engine 23 from power reservoir 12 when a measured torsional load exerted on shaft 22 is greater than a value. The value may be adjusted over time, for example based on data collected by the sensors. FIG. 1A shows a first exemplary embodiment in which electric motor-generator 11 operates as an alternator and is driven by way of power take-off from main engine 23 or shaft 22 for the purpose of generating and transmitting electric power to main electric board 28 and to energy reservoir 12 when the torsional load exerted on propeller 21 and shaft 22 is considered low. When the torsional load exerted on propeller 21 and shaft 22 is considered high, electric motor-generator 11 is configured to act as a motor transmitting energy to main engine 23. FIG. 1B shows a second exemplary embodiment, in which electric motor-generator 11 is not configured to transmit electric power directly to main electric board 28, although system 10 can be configured such that main electric board 28 is supplied (constantly, occasionally and/or per demand) with power from power reservoir 12 which are optionally interconnected via an AC/DC converter 8.

Power reservoir 12 may be an original unit or component of ship propulsion system 20, or it may be upgraded or introduced as part of system 10 when retrofitted to propulsion system 20. Original part is defined as part of the manufactured vessel or the vessel as delivered to the vessel's owner. Power reservoir 12 is optionally configured as a fast energy storage unit that has an ultra-high life cycle. It optionally includes one or more of (1) a battery optimized for high life cycle, (2) a super-capacitor or ultracapacitor bank comprises a number of electrostatic energy-storage components, (3) a combination of options 1 and 2 above (4) an electro-mechanical apparatus comprising of a flywheel mechanism, a rotor, electric motor-generator, power converter, controller and ancillary subsystems. The energy reservoir 12 continuously delivers or absorbs electrical energy to/from the electric motor-generator 11.

Controller 13 is configured to generate commands for controlling a flow path of an allocated electric power between electric motor-generator 11 and either one of power reservoir 12 or main engine 23, as well as for controlling the magnitude of the allocated electric power, in accordance with readings produced by one or more sensor connected thereto. System 10 may include at least one sensor configured to produce readings indicative of torsional loads applied on shaft 22 in an opposite direction than the torques produced by main engine 23. Controller 13 is optionally configured as a software-based unit designed to determine and control the energy flow path and the amount of energy to be transferred through the power electronics. Controller 13 receives readings from the sensors and/or from ship's systems (e.g., propulsion system 20), and its main objective is to calculate and predict the torsional loads exerted on shaft 22 and/or propeller 21 by ambient loads, such as loads originating from ocean currents and waves, and to synchronize delivery of energy from or to the power reservoir 12, with purpose to create a less oscillatory or variable environment for main engine 23 in order to improve fuel efficiency and reduce associated added costs.

Shaft manipulator 14 is configured to apply torques in magnitude and direction determined in accordance with the commands generated by controller 13. The shaft manipulator 14 is optionally configured as a power electronics unit responsive to controller 13, configured to transfer electrical energy by means of torque, from energy reservoir 12 to the electric motor-generator 11.

In some embodiments, system 10 includes or is connected to at least one sensor configured to collect information in the ship. The at least one sensor may be selected from a group comprising of a torque meter, a force meter or a strain gauge 15 coupled to shaft 22, a pressure sensor 16 positioned in proximity to propeller 21, a gyro unit and/or Accelerometer 17 fixated relative to transverse axis Y of the ship, a speedometer 18 configured to record rotational velocity of engine 23, and a flow meter or level gauge 19 configured to record state or change in state related to fuel consumption by the main engine 23.

Figure 2:
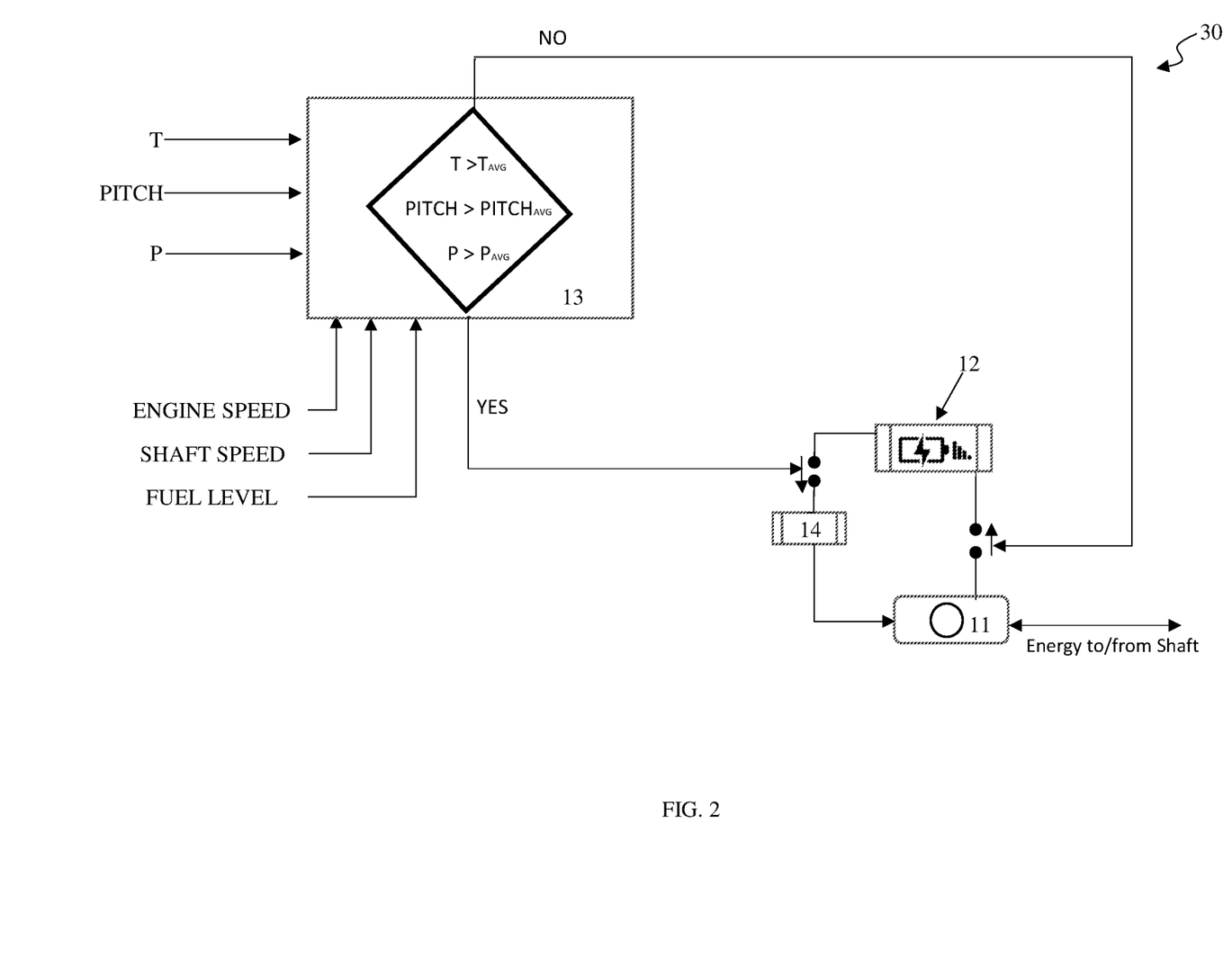
FIG. 2 shows a block diagram of an exemplary method for alleviating variations in ambient torsional loads, according to some embodiments; and, FIG. 3 shows a method for providing power to an engine of a system applied by cyclic forces, according to exemplary embodiments of the subject matter.

FIG. 2 shows a block diagram 30 of an exemplary method of alleviating variations in ambient torsional loads. In this exemplary method, controller 13 receives measurements of torques T applied on the shaft, ship's pitch PITCH, and ambient water pressure P in proximity to propeller 21. Controller 13 also receives data indicative of rotation rate (RPM) of main engine 23 and shaft 22, engine's fuel consumption or level, and/or other supportive indications. Measurements of all or most parameters are periodically manipulated, and gradients are continuously calculated.

Ship's angle of pitch (or bow's acceleration upwards or both) can be used as a preceding input which can trigger the system into work cycle, as the pitch angle is inputted a few seconds or fractions of a second ahead of other inputs. Optionally, during a first period when the ship begins a journey, controller 13 initiates a preliminary session for measuring, analyzing and/or calculating parameters of wave cycles indicative of patterns of continuously changing torque applied on shaft 22 by engine 23 and through ambient torsional loads. Controller 13 can then compute predicted parameters for optimizing propulsion system 20 function in later periods of the ship journey. When the torque applied on shaft 22 is greater than a value, the electric motor-generator 11 extracts energy from power reservoir 12 and delivers the energy to shaft 22. The value may be an output of an arithmetic function. When the torque is less than the value, the electric motor-generator reloads the power reservoir 12. The amount of energy delivered in each cycle is controlled by the period of time the switches are connected. The longer the switches are closed, the greater the energy transfer between the system components.

In some embodiments, controller 13 is programmed to extrapolate a parameter indicative of a wave cycle from readings produced by the one or more sensors. The controller 13 may further be programmed to determine an optimized operating point of the main engine during a follow-up control period consisting of a predetermined number of repetitions of the wave cycle or portion thereof. The optimized operating point may be defined as a target function of maximizing the propulsive efficiency of not only the engine but of the entire propulsion system or vessel in which the engine operates. In other words, the optimized operating point is configured to optimize fuel consumption per distance unit, not the amount of power exerted by the engine per fuel unit. The controller 13 may further be programmed to calculate a difference between the total torsional loads and torques applied by the main engine 23 to the shaft 22 when the main engine operates in accordance with the determined optimized operating point, during the follow-up control period. The controller 13 may further be programmed to generate commands to operate the shaft manipulator 14 such that the shaft manipulator applies torques to the shaft 22 in magnitude and direction compensating for the difference, during a period equal to the follow-up control period.

In same or other embodiments, controller 13 is programmed to measure a group of consecutively recorded values indicative of torsional loads applied on the shaft 22. The recorded values may include at least one of (a) moments, forces or stresses generated on a portion of the shaft adjacent to coupling thereof to the main engine, (b) moments, forces or stresses generated on propeller 21 or on a portion of the shaft 22 adjacent to coupling thereof with the propeller 21, (c) pressure in water surrounding the propeller 21, (d) relative or absolute ship pitch about ship's transverse axis Y, (e) main engine and/or shaft rotational velocity, and (f) fuel data related to fuel consumption by the main engine 23.

The recorded values may forecast a predicted value indicative of a future torsional load applicable on the shaft 22. The controller 13 may be programmed to generate a predicted torsional load, accurately timed to affect the shaft 22 and/or to measure an up-or-down movement of a portion of the ship, a pitch angle relative to waterline or horizon, and/or a pitch acceleration of the ship.

Controller 13 may be programmed to compute a reference value representing a torsional load from the group of recorded values and a parameter indicative of a wave cycle. The controller 13 may be further programmed to measure at least one follow-up recorded value indicative of torsional loads applied on the shaft 22 after performing the extrapolation, within a follow-up control period consisting of a predetermined number of repetitions of the wave cycle or portion thereof.

For example, after measuring 10-30 cycles of load, with 200-300 kW fluctuations on a 3 MW engine, the calculated reference load was determined as 2720 kW, with an upper limits of 3,000 kW and a lower limit of 2,400 kW, the electric motor-mode was activated when the load was higher than 2720 kW to the extent of the difference between the instantaneous load (e.g. 2,800 kW) and the calculated reference load (2720 kW) and when the load was lower than 2720 kW the generator-mode was activated and drew power to the extent of the difference between the calculated reference load (2720 kW) and the instantaneous load (e.g. 2,600 kW), hence reducing the fluctuation of the overall load exerted on the engine to less than 30 kW over or under the reference load.

The controller 13 may be programmed to apply a compensating moment in a direction opposite to torque direction applied to the shaft 22 by the main engine 23 during the follow-up control period, if sum of the at least one follow-up recorded value is smaller than the calculated reference torsional load, such that the total torsional load applied to the shaft during the follow-up control period approximates the reference torsional load. Likewise, the controller 13 may be programmed to apply a compensating moment in the torque direction applied to the shaft 22 by the main engine 23 during the follow-up control period such that the total torsional load applied to the shaft during the follow-up control period approximates the calculated reference torsional load.

The controller 13 may be programmed to calculate a magnitude of the compensating moment based on integration of (a) the at least one follow-up recorded value during a first portion of the follow-up control period, and/or (b) an at least one predicted value indicative of a future torsional load to be applied on the shaft during the remainder of the follow-up control period.

Figure 3:
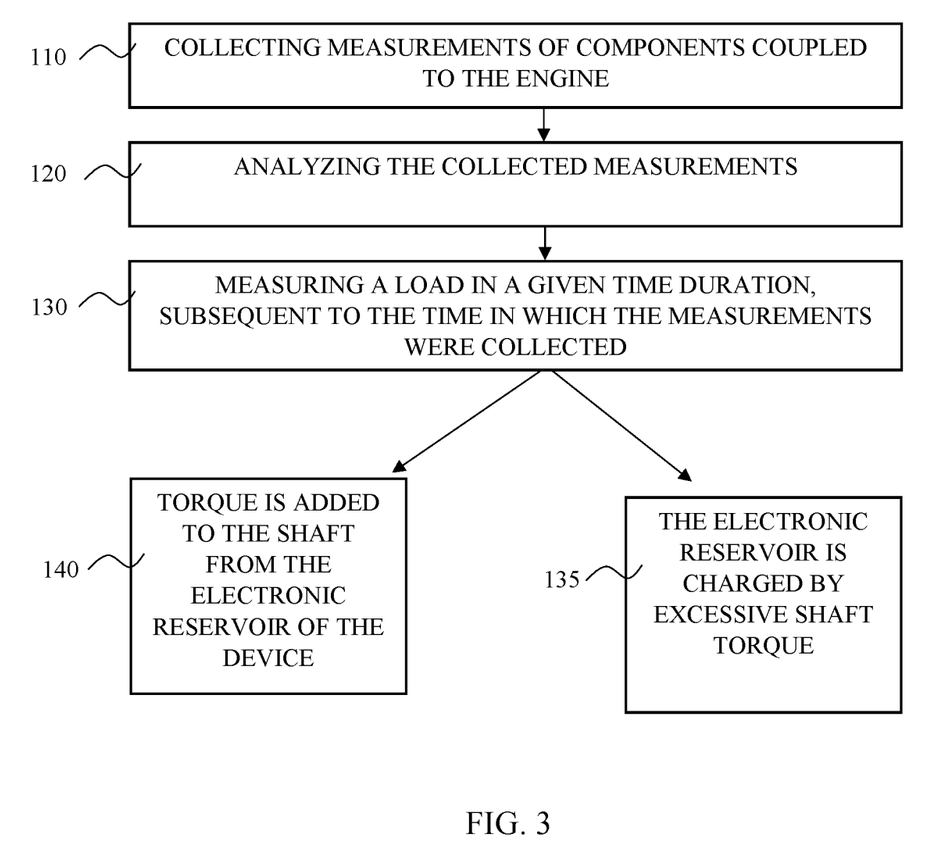

FIG. 3 shows a method for providing power to an engine of a system applied by cyclic forces, according to exemplary embodiments of the subject matter. The cyclic forces may be waves, or other inertial forces that have a periodic pattern.

Step 110 discloses collecting measurements of components coupled to the engine. The measurements may comprise movement of the device consuming power, the device's engine functionality, such as number of rounds per minute, and measurement of torsional load over time.

Step 120 discloses analyzing the collected measurements. Analyzing may comprise inputting the collected measurements into a function that outputs a value representing the load over time. The time may be, for example a number of cycles, such as a number of 5 to 20 cycles.

Step 130 discloses measuring a load in a given time duration, subsequent to the time in which the measurements were collected. The measured load is then compared to the value representing the load over time as computed in step 120.

In case the measured load is higher than the value, as shown in step 140, torque is added to the shaft from the electronic reservoir of the device. In case the measured load is lower than the value, as shown in step 135, the electronic reservoir is charged by excessive shaft torque.

Figure 4:
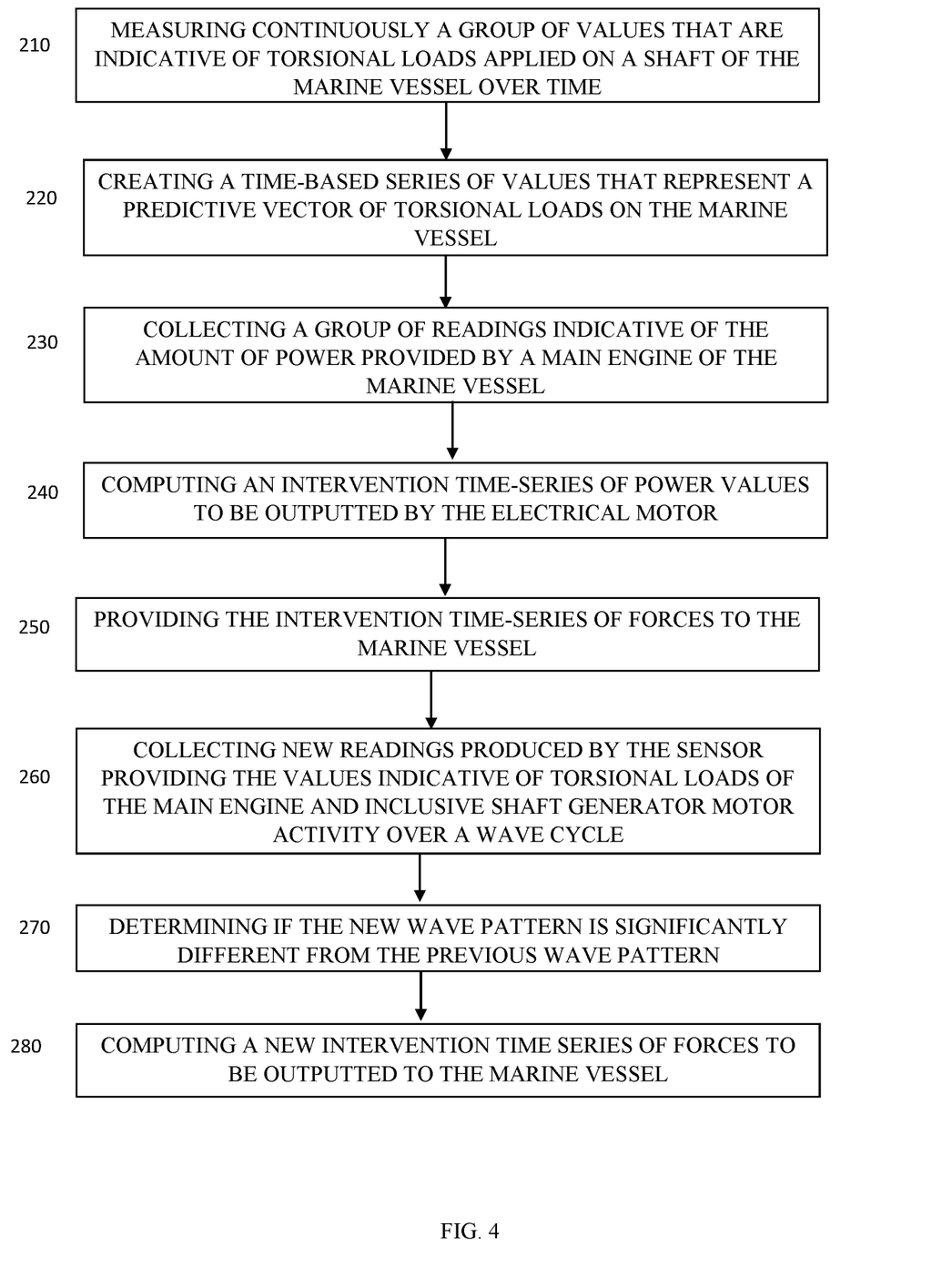
FIG. 4 shows a method for providing power to an engine of a system applied by cyclic forces, according to exemplary embodiments of the subject matter.

FIG. 4 shows a method for providing power to an engine of a system applied by cyclic forces, according to exemplary embodiments of the subject matter. The cyclic forces may be waves or other inertial forces that have a periodic pattern. The method may be utilized by a marine vessel, such as a boat, a ship, a ferry, and the like. Such marine vessels suffer from forces applied by waves, and the additional power supplied by the marine vessel's main engine wastes a great amount of energy and fuel to apply counter forces to the loads resulting from the waves. The subject matter provides a method to minimize the changes in the power outputted by the marine vessel's main engine, thereby improving the main engine's efficiency.

Step 210 discloses measuring continuously a group of values that are indicative of torsional loads applied on a shaft of the marine vessel over time. The group of values may be measured over multiple cycles. For example, in case a standard wave cycle's duration is around 7-20 seconds, the group of values may comprise torsional load measurements collected over 60-200 seconds. The time duration for collecting the group of values may be defined by a person skilled in the art. The time duration for collecting the group of values may be computed by software or a device that receives torsional loads over time and determines the relevant time duration or a range of time durations according to a set of rules or according to functions performed by a statistical-based software model. The time duration may be updated from time to time when needed. The group of values may be collected by a motion sensor, e.g., torque meter, accelerometer, or multiple sensors, placed on a shaft of the marine vessel.

Step 220 discloses creating a time-based series of values that represent predictive time-based torsional loads on the marine vessel. The time-based series of power values may be an output of a function that identifies changes or trends in the group of values, for example, an increase or decrease over time. This way, the values in the predictive vector may be different from the values measured in the group of values.

The predictive vector may represent a time-based series of torsional loads over at least one cycle of the waves. The predictive vector may thus be outputted, generated or computed once every wave cycle, or several times per wave cycle.

Step 230 discloses collecting a group of readings indicative of the amount of power provided by a main engine of the marine vessel. The group of readings may be provided by a sensor located near the main engine. The group of readings may include a time duration of at least one wave cycle. The sampling rate of the group of readings may be defined by a person skilled in the art. The sampling rate may be updated from time to time when needed by a software or a device that receives torsional loads over time and determines the relevant sampling rate according to a set of rules or according to functions performed by a statistical-based software model.

Step 240 discloses computing an intervention time series of power values to be outputted by the electrical motor-generator. The intervention time series may be computed by a control unit coupled to the electrical motor-generator based on a set of rules. The intervention time series comprises a time-based series of power values. The power values in the intervention time series represent the changes in the torsional loads predicted to be applied on the shaft. For example, in case a wave cycle's duration is 10 seconds, during about 6 seconds of the wave cycle the torsional load is higher than a threshold and during about 4 seconds of the wave cycle, the torsional load is lower than a threshold. For example, the threshold may be 1000 kilowatts, the minimal value in the predicted cycle may be 850 kilowatts and the maximal value in the predicted cycle may be 1150 kilowatts, all representing a predicted torsional load in the shaft during a wave cycle. In such cases, the values in the intervention time series may be in the range of (−150) to (+150) Kilowatts, to alleviate the changes in the torsional loads. The intervention time-based series values may be computed for a single wave, or for a series comprising multiple waves. Such series may include waves that have properties that make the cycles distinct in a manner larger than a threshold. Such properties may be the wave cycle's time duration, the amplitude of the load during the cycle, the maximal difference between measurements in the cycle, and the like. For example, a series of 4 cycles, in which cycles #1, #3, and #4 have a higher amplitude than cycle #2, and cycles #2 and #3 have a longer duration.

The time-based series may be computed using a software model. The model receives load measurements and the amount of power outputted by the main engine over time. The software model may then output a time-series of intervention values that represent values of power to be outputted by the electrical motor-generator over time according to a target function configured to minimize the changes sensed by the main engine sensor, or the changes in the power outputted by the marine vessel's main engine.

The time-based series may be computed using a deterministic model such as digital signal processing with an optional application of a low-pass-filter and usage of Fourier Transform to pick up the lowest possible frequency for repeating n-wave pattern resolution and then by applying m times n-wave patterns to calculate the representing n-wave pattern. The Fourier Transform may be substituted by a custom or any other wave examination algorithm such as Sea Wave Analytical Model.

Figure 5:
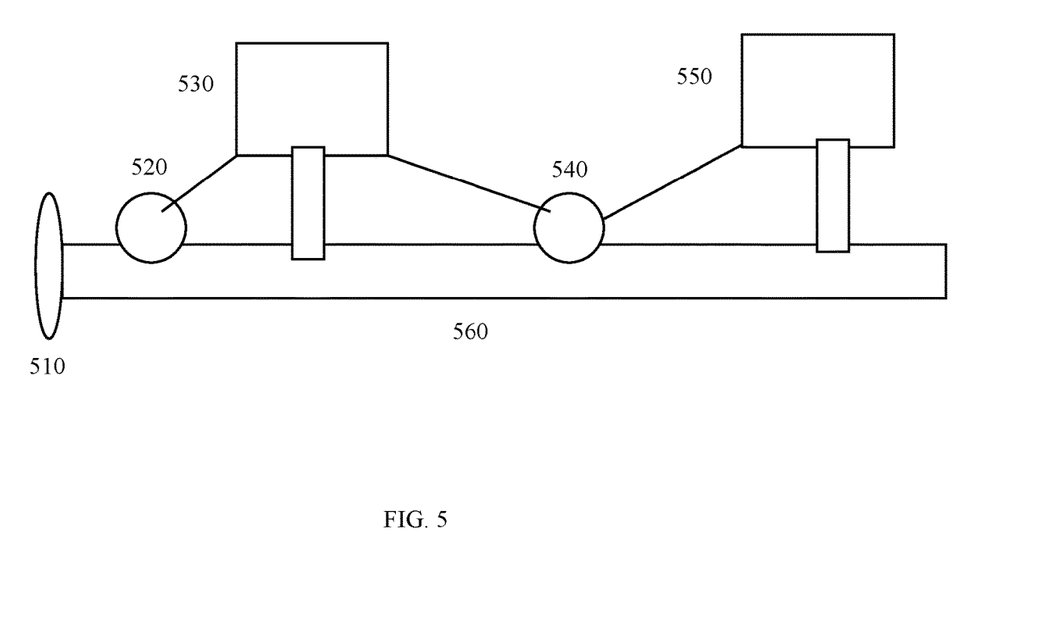
FIG. 5 shows a system for providing power to a marine vessel, according to exemplary embodiments of the subject matter.

The time-based series may be computed using a machine learning approach that suggests applying models such as but not limited to Linear Regression, Long Short-Term Memory (LSTM) neural network, Autoregressive Integrated Moving Average (ARIMA) with input variables of torque from the propeller side torque-meter (520), main engine fuel rate meter, accelerometer (1-6 axes). The models may have a target variable of a minimal integral of absolute values of the n-wave pattern produced by the engine side toque-meter (540).

In some cases, the time-based series may be computed using a combination of the two approaches, the deterministic and the machine learning. Unsupervised or Reinforcement Learning is possible but not limited to ML methods for further optimization.

The time-series intervention values calculation is based on the above-mentioned predetermined n-wave pattern combined with the dynamic determination of the overall system efficiency including the electric equipment, energy storage, and transmission with the application of time delays in the main engine reaction to the external torsional loads.

Step 250 discloses providing the intervention time-series of forces to the marine vessel. The intervention time-series of forces is provided by a secondary motor-generator coupled to the marine vessel's shaft. The secondary motor-generator may be an electrical motor-generator placed in the marine vessel, in addition to the marine vessel's main engine. The secondary motor-generator may include at least one of a generator, an integrated motor-generator unit, plurality of generators, a plurality of electric motors or any combination thereof. The secondary motor-generator is coupled with an interface unit that receives the values of the intervention vector of forces from a control unit. The control unit may determine the amount of power provided to/from the secondary motor-generator. This way, suppose that the intervention vector of forces comprises a time-based series of a thousand (1,000) values over 10 seconds, the control unit will send commands to the secondary engine interface unit 100 times per second.

Step 260 discloses collecting new readings produced by the sensor providing the values indicative of torsional loads of the main engine and inclusive electric motor-generator activity over a wave cycle. The torsional load readings may be collected similarly to the readings collected on step 210. In some cases, the torsional load readings are measured continuously, for example as long as the marine vessel is in the open water.

Step 270 discloses determining if the new wave pattern is significantly different from the previous wave pattern. The new wave pattern is computed based on the new readings of the values indicative of torsional loads. The new wave pattern may be defined by the wave cycle's time duration, the pattern's maximal value, the pattern's difference between subsequent measurements, and the like. The term significantly different may be defined by a threshold, for example in case the new cycle is higher or lower than the previous pattern by more than 5 percent, this may be sufficient to define the new pattern as different.

Step 280 discloses computing a new intervention vector of forces based on the new pattern and applying the new intervention vector of forces on the shaft.

FIG. 5 shows a system for providing power to a marine vessel, according to exemplary embodiments of the subject matter. The system comprises a shaft 560 coupled to a propeller 510. The propeller 510 is configured to push water when the shaft 560 rotates. The system comprises two engines configured to provide power to the shaft 560. One of the engines is the marine vessel's main engine 550 and the other engine is an electrical motor-generator (530). The main engine may be a diesel engine, or another type of engine that is more sensitive to changes, meaning that much fuel or another source of energy provided to the main engine 550 is wasted when the main engine 550 increases or decreases the amount of power it provides or draws. The main engine 550 receives signals collected by a main engine sensor 540 that measures the torsional loads on the shaft 560 on an intervention section. The intervention section is defined as a section on the shaft located between the point where the main engine 550 is coupled to the shaft 560 and the point where the electrical motor-generator 530 is coupled to the shaft 560. The data collected by the main engine sensor 540 may also be provided to the electrical motor-generator 530 to provide signals representing the load sensed by the main engine 550. The subject matter aims to minimize the changes in the load sensed by the main engine 550. The electrical motor-generator 530 outputs the intervention signal that alleviates variations in the torsional loads sensed by torsional sensor 520. The torsional sensor 520 is located on the shaft between the propeller 510 and the point where the electric motor-generator 530 is coupled to the shaft 560. The intervention signal is configured to minimize the changes in the measurements sensed by the main engine sensor 540 and/or minimize the changes in the power outputted by the main engine 550 in order to minimize the amount of resource used by the main engine, said resource may be fuel and the like.

Figure 6A:
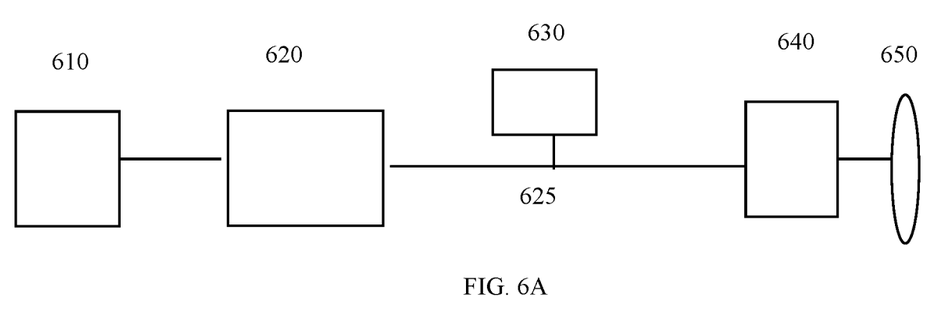
FIGS. 6A-6C show architectures used in a marine vessel having an electric motor that drives a propeller of the marine vessel.
Figure 6B:
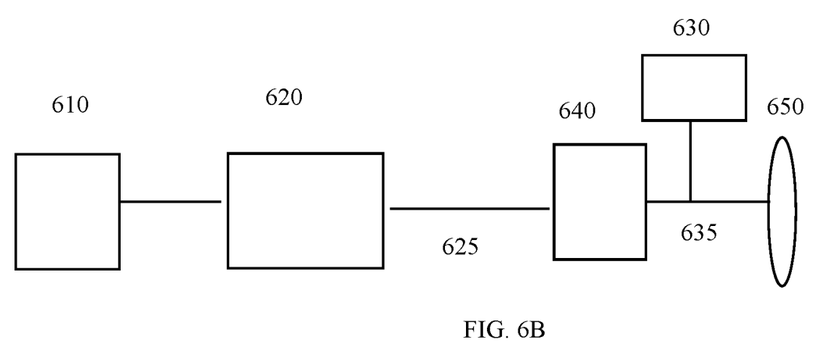
Figure 6C:
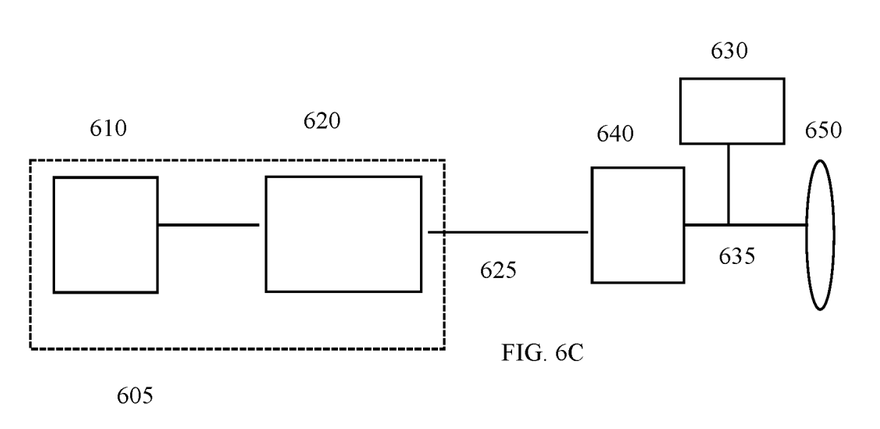

FIGS. 6A-6C show architectures used in a marine vessel having an electric motor that drives a propeller 650 of the marine vessel. The architecture shows a main engine 610 that provides energy to the electric motor 640. The main engine 610 may be a diesel engine, a nuclear engine, a fuel cell or another type of engine that is sensitive to changes, meaning that much fuel or another source of energy provided to the main engine 610 is wasted when the main engine 610 increases or decreases the amount of power that the main engine 610 provides. The term "provide" includes outputting power, drawing power, or alternately providing and drawing power. Power can be electric, such as electric current added to the cable 625 or drawn from the cable 625. The term "provide" includes outputting mechanical power, drawing mechanical power, or alternately providing and drawing mechanical power.

The main engine 610 may be coupled to a generator 620 configured to convert mechanical energy outputted by the main engine 610 to electrical energy with current. Some engines, such as fuel cells, may supply energy to the electric motor 640 without an intermediate generator. The electrical energy outputted by the generator 620 is then transferred over a medium capable of carrying electrical energy, for example, a cable 625. The electric motor 640 receives the electrical power over the cable 625 and outputs power that moves the propeller 650.

The technical solution for the limited efficiency of the main engine 610 involves a system and a method for alleviating the changes in the main engine's operation. The changes are first detected by one or more propeller sensors that measure a load from the propeller. Based on the changes in the load, the marine vessel comprises an intervention unit that outputs a sequence of interventions to alleviate the changes sensed by the propeller 650 due to sea waves or any other source of interference. The sequence of interventions may be provided based on the intervention vector computed by multiple techniques disclosed above. The sequence of interventions may be provided in an electric manner or a mechanic manner. The sequence of interventions may be provided by a magnetic field or in any other manner that changes the power sensed by the main engine. The electric manner may be defined by providing electric current or drawing electric current as elaborated below, for example to the cable 625 that connects the main engine 610 to the electric motor 640. The mechanic manner may be defined as increasing or decreasing the load on a shaft, and/or adding power to it. The shaft may connect the electric motor 640 to the propeller or the shaft that connects main engine 610 to the generator 620.

The sequence of interventions may be provided by a system that comprises an energy reservoir and an inverter 630 and/or a power generator. In case the sequence of interventions are electric, the interventions may be provided by the inverter. In case the sequence of interventions are mechanical, the system comprises an electrical motor generator that outputs the intervention vector of power, for example as described in step 250. It should be noted that the inverter is not an essential component in the subject matter and other components can determine and provide the sequence of interventions, such as a regulator, a controller and the like.

The subject matter discloses multiple architectures for reducing fuel consumption of the main engine 610 of the marine vessel. In the first exemplary embodiment, the system of the subject matter comprises an electrical motor generator that provided electrical power or load in values that represent the sequence of interventions. The sequence of interventions may be computed in various techniques and the first case discloses an energy reservoir that outputs energy in addition to the engines or motors of the marine vessel. The method of the subject matter first measures a set of values over at least one wave cycle and computes the sequence of interventions based on the collected measurements. In some cases, the method further computes a predictive sequence of values that represent a future set of loads on the marine vessel's engine or motor and provides the sequence of interventions based on the predictive sequence. The method of the subject matter may measure the load on the engine or motor also after providing the sequence of interventions in order to further improve the effectiveness of the sequence of interventions.

In the second exemplary embodiment, the system comprises sensors used to compute the values of the intervention vector. The values of the intervention vector may be represented as electric power or energy, such as electric current provided to the cable 625 or drawn from the cable 625 or power added to or drawn from a shaft in the marine vessel. As such, the inverter is coupled to the cable 625 and changes the electrical current transferred therein. Such change may be by adding or reducing electrical power or energy, such as current. Due to the changes dictated by the inverter, the main engine 610 may provide power in a relatively steady manner, while the power provided from the electric motor 640 to the propeller 650 will change during the wave cycle.

In a third exemplary embodiment, instead of using torque meters, the claimed invention measures electrical properties such as electric current. The measurement may be done at least by placing sensors near the electric motor 640 and/or the generator 620. One sensor may be a propeller sensor configured to measure the torsional loads on the propeller 650 and a second sensor is a main engine sensor configured to detect the load sensed by the main engine. The sensors may be electric sensors for sensing electrical power or a magnetic field created or changed due to the electric power transferred over the medium 625.

The subject matter encompasses both a method for alleviating changes in the operation of the marine vessel's main engine, a system that outputs the sequence of interventions for alleviating the changes, and a marine vessel having (a) a main engine that is sensitive to changes in the torsional loads and (b) the system that outputs the sequence of interventions for alleviating the changes.

FIG. 6C shows a system for alleviating variations in power or energy supplied by a fuel cell in a marine vessel, according to exemplary embodiments of the subject matter. The system comprises a fuel cell 605 module that supplies electrical power to the electrical motor 640.

Figure 7:
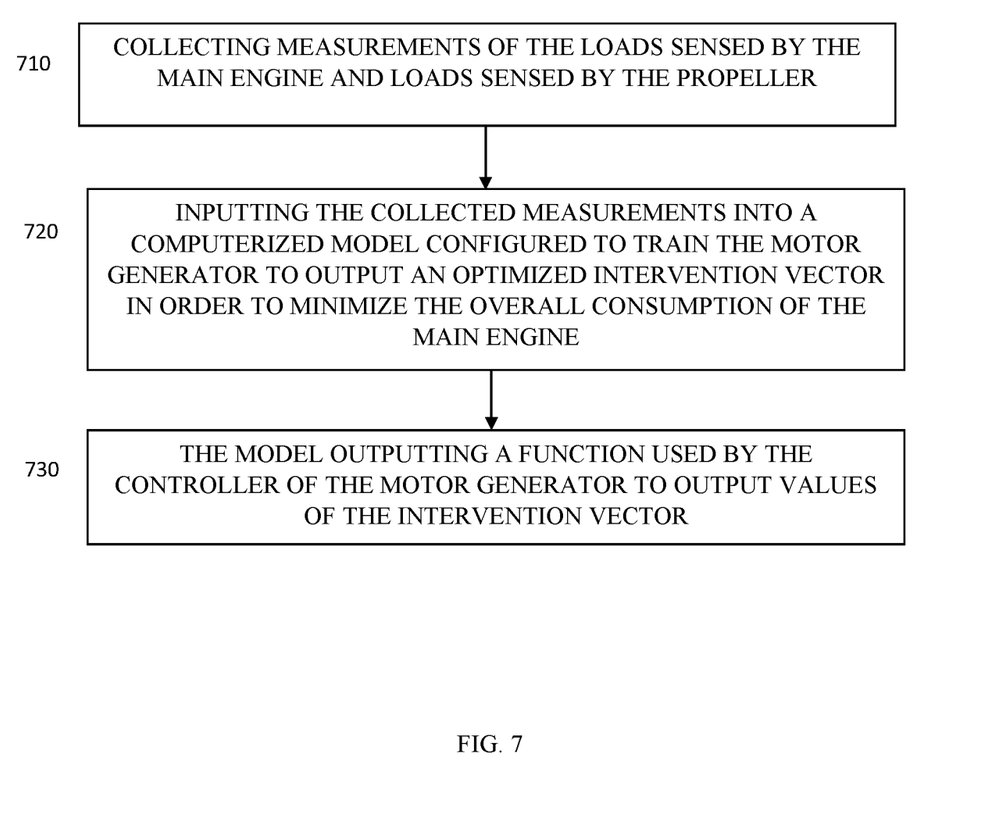
FIG. 7 shows a method for improving the accuracy of the intervention vector, according to exemplary embodiments of the subject matter.

When the propeller sensor measures an electric property such as current or a magnetic field, the propeller sensor is located between the electric motor and an intervention point of the intervention unit on the cable. When the propeller sensor measures a mechanical load, the propeller sensor is located between the electric motor and the propeller or between the main engine and the generator, closer to the generator. When the main engine sensor (if exists) measures a mechanical load or power, the main engine sensor is located between the main engine and the generator or on a shaft connecting the electric motor to the propeller, closer to the motor. When the main engine sensor (if exists) measures an electric property, the main engine sensor is located between the generator and an intervention point of the intervention unit on the cable. FIG. 7 shows a method for improving the accuracy of the intervention vector, according to exemplary embodiments of the subject matter.

Step 710 discloses collecting measurements of the loads sensed by the main engine and loads sensed by the propeller. The measurements may be mechanical or electric.

Step 720 discloses inputting the collected measurements into a computerized model configured to train the system to output an optimized intervention vector in order to minimize the overall consumption of the main engine. The feedback measurement is used to continuously train the algorithm creating the intervention vector to improve it over time.

Step 730 discloses the model outputting a function used by the controller of the motor generator or the inverters to output values of the intervention vector. The function outputted by the model may be a target function with a target to minimize the changes in the power outputted by the marine vessel's main engine. The collected measurements from the feedback sensor are hence used as a supervised ML result set.

In some exemplary embodiments, the method further uses measurements of fuel consumption by the marine vessel's main engine. The measurements may be collected by a fuel rate meter, for example coupled to a fuel pump and/or tubes that transfer fuel to the main engine. The controller of the subject matter may compute engine fuel consumption as a function of load exerted on the main shaft. The fuel rate may indicate the latency of the governor's reaction to the load. The fuel rate may also provide an indication as to the accuracy of the intervention vector, as the subject matter aims to minimize changes in the fuel consumption. The data from the fuel rate meter may be inputted into the model to provide a supervised ML result set.

In some exemplary embodiments of the subject matter, the energy provided by the electrical motor-generator or inverters according to the intervention vector is used by a secondary consumer in addition to driving the marine vessel. The secondary consumer may be refrigerators, ancillary systems, cranes and the like. For example, the main engine's threshold may be 1000 kilowatts, the minimal value in the predicted cycle may be 850 kilowatts and the maximal value in the predicted cycle may be 1150 kilowatts, all representing a predicted torsional load in the shaft during a wave cycle. In such cases, the values in the intervention time series may be in the range of (+50) to (+350) Kilowatts, resulting in an accumulated power of 1200 kilowatts, having an excess of 200 kilowatts in addition to the power used to drive the marine vessel, such excessive power is then transferred to the secondary consumer.

Each of the following terms written in singular grammatical form: 'a', 'an', and 'the', as used herein, means 'at least one', or 'one or more'. Use of the phrase 'one or more' herein does not alter this intended meaning of 'a', 'an', or 'the'. Accordingly, the terms 'a', 'an', and 'the', as used herein, may also refer to, and encompass, a plurality of the stated entity or object, unless otherwise specifically defined or stated herein, or, unless the context clearly dictates otherwise. For example, the phrases: 'a unit', 'a device', 'an assembly', 'a mechanism', 'a component', 'an element', and 'a step or procedure', as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: 'includes', 'including', 'has', 'having', 'comprises', and 'comprising', and, their linguistic/grammatical variants, derivatives, or/and conjugates, as used herein, means 'including, but not limited to', and is to be taken as specifying the stated component(s), feature(s), characteristic(s), parameter(s), integer(s), or step (s), and does not preclude addition of one or more additional component(s), feature(s), characteristic(s), parameter(s), integer(s), step(s), or groups thereof. Each of these terms is considered equivalent in meaning to the phrase 'consisting essentially of'.

The term 'method', as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Throughout this disclosure, a numerical value of a parameter, feature, characteristic, object, or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range 'from 1 to 6' also refers to, and encompasses, all possible sub-ranges, such as 'from 1 to 3', 'from 1 to 4', 'from 1 to 5', 'from 2 to 4', 'from 2 to 6', 'from 3 to 6', etc., and individual numerical values, such as '1', '1.3', '2', '2.8', '3', '3.5', '4', '4.6', '5', '5.2', and '6', within the stated or described numerical range of 'from 1 to 6'. This applies regardless of the numerical breadth, extent, or size, of the stated or described numerical range.

Moreover, for stating or describing a numerical range, the phrase 'in a range of between about a first numerical value and about a second numerical value', is considered equivalent to, and meaning the same as, the phrase 'in a range of from about a first numerical value to about a second numerical value', and, thus, the two equivalently meaning phrases may be used interchangeably. For example, for stating or describing the numerical range of room temperature, the phrase 'room temperature refers to a temperature in a range of between about 20° C. and about 25° C.', and is considered equivalent to, and meaning the same as, the phrase 'room temperature refers to a temperature in a range of from about 20° ° C. to about 25° C.'.

The term 'about', as used herein, refers to +10% of the stated numerical value.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment, may also be illustratively described and presented in the context or format of a plurality of separate embodiments.

Although the invention has been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

All publications, patents, and or/and patent applications, cited or referred to in this disclosure are herein incorporated in their entirety by reference into the specification, to the same extent as if each individual publication, patent, or/and patent application, was specifically and individually indicated to be incorporated herein by reference. In addition, citation or identification of any reference in this specification shall not be construed or understood as an admission that such reference represents or corresponds to prior art of the present invention. To the extent that section headings are used, they should not be construed as necessarily limiting.

What is claimed is:

1. A system for alleviating variations in loads applied to a main engine of a marine vessel, said main engine outputs power transferred to an electric motor that drives a propeller of the marine vessel, the system comprising:
   an intervention unit configured to provide a sequence of interventions at an intervention point located between the main engine and the propeller;
   a controller coupled to the intervention unit, said controller is configured to execute a set of instructions, comprising:
      measuring a group of values that are indicative of loads applied on the marine vessel over time;
      creating a time-based series of values that represent a predictive time-based loads on the marine vessel;
      computing an intervention time series of values to be outputted by the intervention unit based on the predictive time-based loads on the marine vessel;
   wherein the intervention unit provides the sequence of interventions according to the intervention time series of values.

2. The system of claim 1, wherein the sequence of interventions includes electrical current provided to or drawn from an electric cable transferring current from the main engine to the electric motor.

3. The system of claim 1, wherein the sequence of interventions includes mechanical power provided to or drawn from a drivetrain of the marine vessel.

4. The system of claim 1, wherein the main engine comprises a fuel cell.

5. The system of claim 1, wherein the main engine module comprises a diesel engine and a generator, said generator supplies electrical current to the electric motor.

6. The system of claim 1, wherein the instructions further comprise;
   collecting new readings produced by a sensor providing the values indicative of loads on the main engine;
   determining if the new wave pattern is significantly different from the previous wave pattern;
   computing an improved intervention vector and applying a new sequence of interventions.

7. The system of claim 1, further comprises a propeller sensor configured to measure the torsional loads on the propeller and a main engine sensor detecting the load sensed by the main engine.

8. The system of claim 7, wherein the propeller sensor measures a mechanical load and is located between the electric motor and the propeller.

9. The system of claim 7, wherein the propeller sensor measures an electronic property and is located between the electric motor and the intervention point of the intervention unit.

10. The system of claim 7, wherein the main engine sensor measures a mechanical load and is located between the main engine and the generator.

11. The system of claim 7, wherein the main engine sensor measures an electronic property and is located between the main engine and the intervention point of the intervention unit.

12. The system of claim 1, further comprises a fuel sensor configured to collect readings indicative of a fuel flow rate provided to the main engine.

13. The system of claim 1, further comprises a motion sensor of the marine vessel configured to collect readings indicative of motion of the marine vessel.

14. The system of claim 1, further comprises an input from an integral main engine controller (governor) of the marine vessel configured to collect readings indicative of the actions performed by the marine vessel.

15. The system of claim 1, wherein computing the intervention time series of power values to be outputted by the intervention unit based on loads indicative of multiple wave cycles.

16. The system of claim 1, wherein computing the intervention time series of power values to be outputted by the intervention unit based on a software model, wherein the software model is configured to reach a minimal value of differences in power outputted by the main engine of the marine vessel.

17. The system of claim 1, wherein computing the intervention time series of power values to be outputted by the intervention unit based on a target variable of minimal integral of absolute values produced by the main engine of the marine vessel.

18. The system of claim 1, wherein the instructions further comprise determining a time delay of the main engine based on the readings indicative of the amount of power provided by a main engine of the marine vessel.

19. The system of claim 1, wherein the intervention unit comprises an inverter.

20. The system of claim 1, wherein the intervention unit comprises a motor-generator.

21. The system of claim 1, wherein configured to alleviate variations of loads by applying electricity variating regime according to the optimized time series of power intervention values.

22. The system of claim 1 utilizing external energy sources to alleviate variations of loads by applying assisting power according to the optimized time series of power intervention values.

* * * * *